G. H. HOUCK.
WRECKING TRAILER FOR AUTOMOBILES.
APPLICATION FILED JULY 8, 1919. RENEWED AUG. 7, 1920.
1,352,898.
Patented Sept. 14, 1920.
2 SHEETS—SHEET 2.
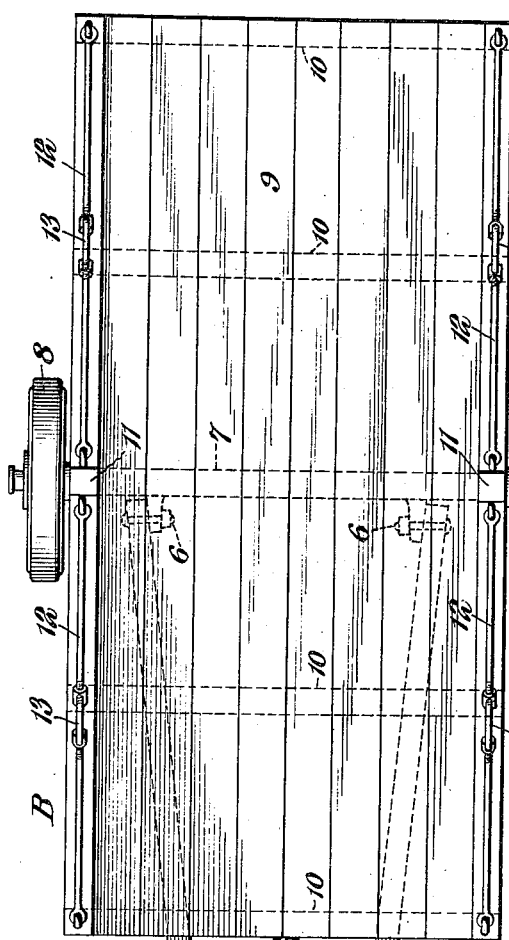
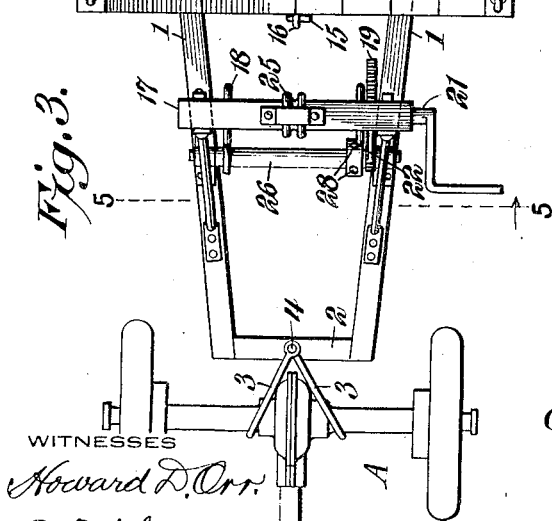
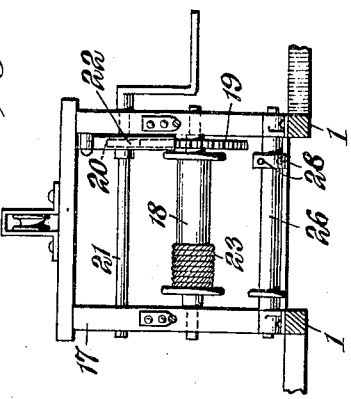
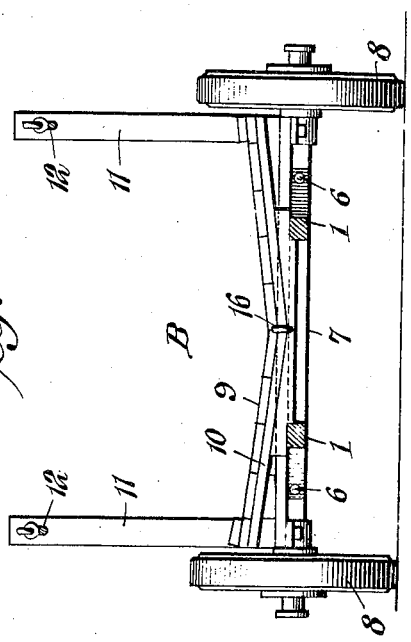
WITNESSES
Howard D. Orr.
F. T. Chapman.
George H. Houck, INVENTOR,
BY C. G. Siggers.
ATTORNEY

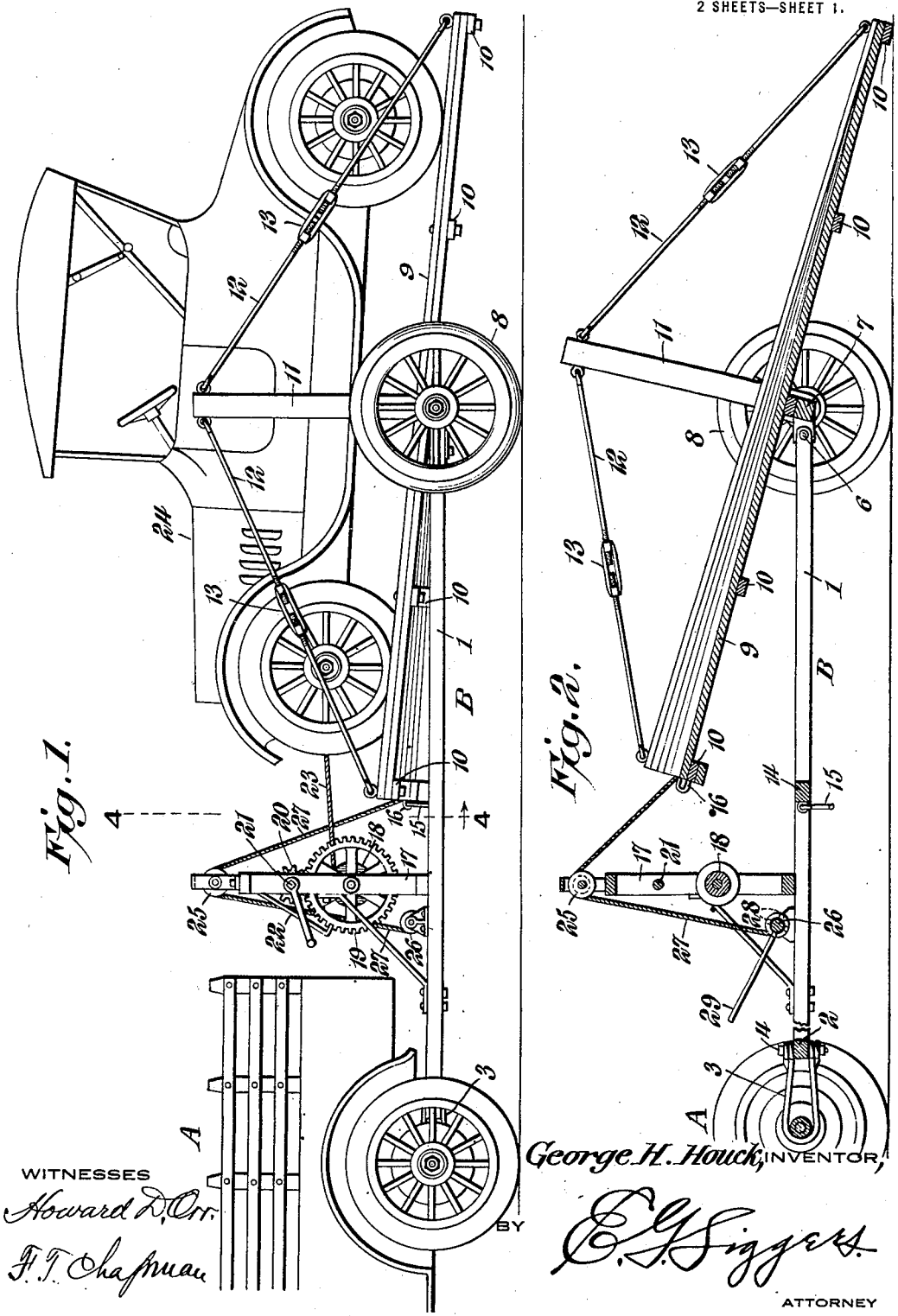

UNITED STATES PATENT OFFICE.

GEORGE HENRY HOUCK, OF TONAWANDA, NEW YORK.

WRECKING-TRAILER FOR AUTOMOBILES.

1,352,898.     Specification of Letters Patent.     Patented Sept. 14, 1920.

Application filed July 8, 1919, Serial No. 309,317. Renewed August 7, 1920. Serial No. 402,034.

*To all whom it may concern:*

Be it known that I, GEORGE H. HOUCK, a citizen of the United States, residing at Tonawanda, in the county of Erie and State of New York, have invented a new and useful Wrecking-Trailer for Automobiles, of which the following is a specification.

This invention has reference to wrecking trailers for automobiles, and its object is to provide a trailer structure attachable to an automobile or truck, upon which structure a damaged motor vehicle may be run or lifted and conveyed to a repair shop or garage or elsewhere, expeditiously.

In accordance with the invention there is provided a truck frame with a pair of wheels at one end and at the other end provided with means for attachment to the rear axle of an automobile. Mounted on the wheeled end of the truck so as to rock thereon is a platform, the axis of rocking being about midway of the length of the platform, which latter is rockable to bring the rear end to the ground thereby permitting the movement of a damaged automobile onto the platform while tipped. Then on rocking the platform toward a level position the automobile is lifted free from the ground and to an approximately level position balanced on the platform permitting its transportation to the desired location. By means of a windlass or other like structure the platform may be suitably tipped and the damaged automobile may be drawn upon it. Furthermore, the platform is so constructed as to automatically center the damaged automobile thereon with respect to the width of the platform.

The invention will be best understood from a consideration of the following detailed description taken in connection with the accompanying drawings forming part of this specification, with the understanding, however, that the invention is not confined to any strict conformity with the showing of the drawings, but may be changed and modified so long as such changes and modifications mark no material departure from the salient features of the invention as expressed in the appended claims.

In the drawings:—

Figure 1 is a side elevation of the wrecking trailer with an automobile thereon and attached to the rear end of another automobile.

Fig. 2 is a longitudinal vertical section of the structure shown in Fig. 1, omitting the automobile from the wrecking trailer.

Fig. 3 is a plan view of the structure shown in Fig. 1 and omitting the damaged automobile.

Fig. 4 is a section on the line 4—4 of Fig. 1, also omitting the damaged automobile.

Fig. 5 is a section on the line 5—5 of Fig. 3, but omitting distant parts.

Referring to the drawings, there is shown the rear portion of an automobile A which may be considered as of the service car type, although, of course, the automobile A may be of any suitable type of ordinary or special construction. Since, however, the invention is intended more particularly for use in connection with garages and repair shops, the automobile A may be considered as a service automobile. In connection with the automobile A there is provided a wrecking trailer B which, because of its character and purpose, may be termed an automobile ambulance. The trailer B is provided with a frame composed of side bars 1 approaching toward one end where they are joined by a cross-piece 2. Fast to the cross-piece 2 are links 3 which may have a common connection with the cross-piece 2 by means of a bolt or pin 4 traversing the cross-piece 2 and on which the links pivot to move about an upright axis. The links 3 may be disconnected from the cross-piece 2 by removing the bolt or pin 4 and then can be readily applied to the rear axle of the service car A and afterward connected to the truck B by the bolt or pin 4.

The side beams 1 diverge from the cross-piece 2 and are pivotally connected or hinged at 6 to an axle 7 upon the ends of which latter are mounted wheels 8, preferably of the solid rubber tire type. The axle has fast to it a platform 9 of a length and width sufficient to accommodate an automobile of the largest size. The axle is located about midway of the length of the platform and the latter is dished, particularly at the forward end, so that on drawing an automobile upon the platform from the rear end the forward end of the automobile will automatically center on the platform with respect to the width of the latter, thus avoiding the need of any special guides. The rear end of the platform may be and preferably is straight or flat instead of dished, thus permitting it to be brought down to the ground. The dishing will then decrease uniformly from the front to the rear end as Figs. 1 and 2 depict. The platform is provided with cross-pieces 10 and at the mid-point of the platform on each side thereof is erected a post 11 connected by brace rods 12 with the opposite ends of the platform, each rod including a turn-buckle 13. This truss construction greatly strengthens the platform without adding materially to its weight so that the platform will readily carry an automobile of the largest size with the only support for the platform at about the mid-point of its length.

The beams 1 may be braced by another cross-piece 14, and by means of a hook 15 on the cross-piece 14 and an eye 16 on the forward end of the platform 9, the latter may be secured in the elevated position for transportation of the trailer from place to place.

Forward of the cross-piece 14 there is erected a windlass frame 17 in which is mounted a winding drum 18 carrying a gear wheel 19 engaged by a pinion 20 on a crank shaft 21 suitably mounted in the frame 17. A pawl 22 permits the turning of the windlass when desired and is so located as to engage between the teeth of the gear wheel 19, thereby holding the windlass in adjusted positions. Any other suitable type of windlass may be used. A rope or chain 23 is made fast to the drum 18 and when the device is in operation is also made fast to the axle or other suitable part of a damaged automobile 24 so that on winding the rope 23 on the windlass, with the platform 9 properly tipped the automobile may be drawn onto the platform and the latter brought to an approximately level position, thus raising the damaged automobile sufficiently from the ground to permit its transportation to some desired point. The rope not only draws the automobile onto the platform, but in co-operation with the dishing already described holds it thereupon during transportation.

The windlass frame 17 carries an idler roller 25, which may be located on top of the frame, and mounted on the bars 1 is a winding drum 26 from which a rope 27 extends over the roller 25 and to the eye 16 or other part of the front of the platform 9. On turning the drum 26 in the proper direction the front end of the platform 9 is raised so that the rear end is brought to the ground, and the platform may be temporarily held in the tipped position while the damaged automobile 24 is being drawn upon the platform. The weight of the automobile 24 may be depended upon to rock the platform 9 to the elevated position, which it will do when the winding drum 26 is released, or the platform itself may be overbalanced to have a normal tendency toward the level position. In either case the platform 9 is raised at its forward end by means of the winding drum 26, which may be provided with a series of holes or sockets 28 to receive a turning bar 29, or any other arrangement may be provided for the purpose.

It not infrequently happens that automobiles are damaged from one cause or another to such an extent that they must be towed in with the aid of a towing jack. Such towing, however, is slow and tedious besides subjecting the automobile to severe shocks especially where the roadway is rough.

With the invention the damaged automobile is carried bodily free from contact with the ground at any point and consequently may be towed much more rapidly than is the case with a towing jack, and the automobile being towed is not at all liable to shocks and jars due to road conditions.

When it is necessary to use the wrecking trailer or automobile ambulance, it may be quickly attached to either a service car or other type of automobile and may be detached therefrom without in any manner impairing or interfering with the use of the automobile or service car for other purposes.

What is claimed is:—

1. A wrecking trailer for automobiles, comprising a truck provided with means at one end for connecting it to and supporting it by a hauling vehicle and a single pair of supporting wheels at the other end, whereby the truck is supported in part by the hauling vehicle and in part by said wheels, a tiltable platform of a size to receive and sustain an automobile and mounted intermediate of its ends on the wheeled end of the truck, and means connected to the forward end of the platform for tilting the platform to bring the rear end to the ground and hold it in the tilted position.

2. A wrecking trailer for automobiles, comprising a truck with means at one end for connecting it to a hauling vehicle and supporting wheels at the other end, and a tiltable platform of a length and width to receive and sustain an automobile, said platform being mounted intermediate of its ends on the wheeled end of the truck to rock on an axis transverse of the truck, the platform being dished on its upper surface at the forward end with the dishing extending laterally of the platform.

3. A wrecking trailer for automobiles, comprising a truck with means at one end for connecting it to a hauling vehicle, and supporting wheels at the other end, and a tiltable platform of a length and width to receive and sustain an automobile, said platform being mounted intermediate of its ends on the wheeled end of the truck to rock on an axis transverse of the truck, the platform being dished on its upper surface, said dishing being greatest at the forward end and rising uniformly from the rear to the front.

4. A wrecking trailer for automobiles, comprising a truck with a tiltable platform of a size to receive and sustain an automobile, said platform being mounted intermediate of its ends at the rear end of the truck, and means on the truck connected to the forward end of the platform for tilting the platform to bring the rear end to the ground and hold the platform in such tilted position, said truck also having means for drawing an automobile onto the tilted platform by way of the low end thereof, and for holding said automobile on said platform during transportation.

5. A wrecking trailer for automobiles, comprising a truck with side beams approaching toward the front end, links at the front end of the truck for application to a hauling vehicle, an axle and wheels at the rear end of the side beams, a platform mounted intermediate of its length on the wheeled end of the truck between the wheels and tiltable on an axis transverse of the truck, to bring the rear end of the platform to the ground, the front end of the platform being dished laterally of its length, a windlass on the truck in front of the platform for drawing an automobile onto the platform, and another windlass with direction changing means higher than the front end of the platform and connected thereto to tilt the platform to bring the rear end into engagement with the ground.

6. A wrecking trailer for automobiles, comprising a truck with means at one end for connecting it to a hauling vehicle, and supporting wheels at the other end, and a tiltable platform of a length and width to receive and sustain an automobile, said platform being mounted intermediate of its ends on the wheeled end of the truck to rock on an axis transverse of the truck, the platform being dished on its upper surface said dishing being greatest at the forward end and least at the rear or loading end and rising uniformly from the rear to the front, and means for drawing an automobile onto the platform when tilted and for holding said automobile in coöperation with said dishing on said platform during transportation.

7. The combination with a motor-driven vehicle, of a trailer composed of a frame provided at one end with means for detachable connection with the rear axle of said vehicle, and the other end having a pair of wheels, a tiltable platform of a size to receive and sustain an automobile and mounted intermediate of its ends on the wheeled end of the frame to rock on an axis transversely thereof, a windlass frame mounted on the first-mentioned frame between the said connecting means and the forward end of the platform, said windlass frame having mounted thereon a windlass for drawing the automobile onto the platform, and another windlass having connection with the forward end of the platform to bring the rear end into engagement with the ground.

In testimony that I claim the foregoing as my own I have hereto affixed my signature.

GEORGE HENRY HOUCK.